United States Patent
Yamanaka et al.

(10) Patent No.: US 6,474,153 B1
(45) Date of Patent: Nov. 5, 2002

(54) PREDICTING SYSTEM AND PREDICTING METHOD CONFIGURED TO PREDICT INFLOW VOLUME OF RAINWATER

(75) Inventors: Osamu Yamanaka; Akihiro Nagaiwa, both of Fuchu; Masajiro Nakada, Adachi-ku; Masahiko Tsutsumi, Fuchu, all of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/510,670

(22) Filed: Feb. 22, 2000

(30) Foreign Application Priority Data

Mar. 9, 1999 (JP) .......................................... 11-061866

(51) Int. Cl.$^7$ ................................................ G01W 1/00
(52) U.S. Cl. .................................. 73/170.17; 73/170.16
(58) Field of Search ........................ 73/170.17, 170.18, 73/170.21; 702/3; 706/931

(56) References Cited

U.S. PATENT DOCUMENTS

| | | | | |
|---|---|---|---|---|
| 4,893,806 A | * | 1/1990 | McLaughlin | 271/272 |
| 4,987,931 A | * | 1/1991 | Shaw et al. | 137/1 |
| 5,342,144 A | * | 8/1994 | Mccarthy | 405/36 |
| 5,796,611 A | * | 3/1995 | Ochiai et al. | 702/3 |
| 5,406,481 A | * | 4/1995 | Shinozawa et al. | 364/420 |
| 5,440,483 A | * | 8/1995 | Badoche-Jaquet et al. | 73/170.19 |
| 6,044,699 A | * | 4/2000 | Greenblat et al. | 73/170.17 |

FOREIGN PATENT DOCUMENTS

| | | | | |
|---|---|---|---|---|
| JP | 10260718 | * | 9/1998 | G05B/23/02 |
| JP | 2000056835 | * | 2/2000 | G05D/7/06 |

* cited by examiner

*Primary Examiner*—Benjamin R. Fuller
*Assistant Examiner*—Andre J. Allen
(74) *Attorney, Agent, or Firm*—Oblon, Spivak, McClelland, Maier & Neustadt, P.C.

(57) ABSTRACT

A predicting system configured to predict an inflow volume of rainwater includes a rainfall volume measuring unit for measuring a rainfall volume that has fallen by a present time, a rainfall volume predicting unit for predicting a rainfall volume in a future, and an inflow-volume measuring unit for measuring an inflow volume of rainwater that has flown into an objective facility by the present time. The system also includes a model identification unit, which has a non-linear model having a Neural-Network model for calculating an inflow volume of rainwater from a rainfall volume, and which has a parameter determining part for determining a degree and coefficient parameters of the non-linear model, based on the rainfall volume that has fallen by the present time measured by the rainfall volume measuring unit and the inflow volume of rainwater that has flown into the objective facility by the present time measured by the inflow-volume measuring unit. An inflow-volume predicting unit is adapted to predict an inflow volume of rainwater flowing into the objective facility in the future, based on the rainfall volume in the future predicted by the rainfall volume predicting unit, according to the non-linear model determined by the model identification unit. Thus, the inflow volume of rainwater flowing into the objective facility can be predicted more accurately even if there is a non-linear relationship between the rainfall volume and the inflow volume of rainwater.

19 Claims, 9 Drawing Sheets

$$A_1(z) = a_{1n}z^n + a_{1(n-1)}z^{n-1} + \cdots + a_{10}$$
$$B_1(z) = b_{1m}z^m + b_{1(m-1)}z^{m-1} + \cdots + b_{10}$$
$$A_2(z) = a_{2n}z^n + a_{2(n-1)}z^{n-1} + \cdots + a_{20}$$
$$B_2(z) = b_{2m}z^m + b_{2(m-1)}z^{m-1} + \cdots + b_{20}$$

△ : RADIAL BASIS FUNCTION $h_i(p)$, ex), $$h_i(p) = \exp(-\|p - c_i\|^2 / d_i^2)$$

($c_i$: CENTER OF RBF, $d_i$: RADIUS OF RBF)

$$Q(t) = \sum_{i=1}^{n} G_i h_i(p)$$

(n: NUMBER OF RBF, $G_i$: WEIGHING PARAMETERS, p: INPUT VECTOR OF RBF (VECTOR)

PREDICTING SYSTEM AND PREDICTING METHOD CONFIGURED TO PREDICT INFLOW VOLUME OF RAINWATER

BACKGROUND OF THE INVENTION

1. Field of the Invention

This invention relates to a predicting system continued to predict an inflow volume of rainwater, which is necessary to operate pumps arranged in a sewage treatment plant in order to drain rainwater in raining, or to control to open or close gates arranged in paths to temporary storing facilities for rainwater (storage basin, storing ducts, adjusting ponds and so on) in order to avoid flooding disasters.

2. Description of the Related Art

The sewage treatment plant not only treats sewage but also plays a role of preventing disasters caused by stormwater. Thus, the sewage treatment plant is an important facility in order to secure urban hygiene and environmental safety. Usually, rainwater is drained off from sewage ducts to a sea or a river via draining pumps arranged in a pump facility or a sewage treatment plant. Thus, it is important to determine the number of the draining pumps to be operated, based on an inflow volume of rainwater into the pump facility or the sewage treatment plant.

Recently, since residential areas have become denser and paved roads have spread, a greater part of rainwater has flown into the sewage ducts. Then, since the pumps have limitations of capacities for draining off the rainwater, temporary storing facilities for rainwater such as storing ducts or adjusting ponds have been provided more often. In the case of using the temporary storing facilities of rainwater, it is important to suitably control open apertures of respective gates to the storing facilities of rainwater.

In order to suitably determine the number of pumps to be operated and efficiently control the open apertures of the respective gates to the storing facilities of rainwater, it is desired to accurately predict an inflow volume of rainwater into the pump facility, the treatment plant or the storing facilities of rainfall and to use the predicted data for the determination and the control.

As the temporary storing facilities for rainwater have developed only recently, no prior art concerning the control of the gates is found. However, concerning the determination of the number of pumps to be operated, there are known two types, which are a type not using a prediction of an inflow volume of rainwater into the pump facility and another type using the prediction of the inflow volume of rainwater into the pump facility.

The type not using the prediction of the inflow volume of rainwater into the pump facility includes a method for determining the number of pumps to be operated based on measured data of rainfall and intuition of an operator of the pump facility, and a method for determining the number of pumps to be operated based on a water level measured by a water gauge arranged in a pump well of the pump facility.

The type using the prediction of the inflow volume of rainwater into the pump facility includes a method of measuring amounts of rainfall that has fallen by the present time by a plurality of rainfall gauges arranged on the ground and predicting the inflow volume of rainwater by using an RRL method. In addition, the type includes a method of constructing a prediction model by estimating parameters of an ARMAX model, which represents a relationship between the rainfall volume and the inflow volume of rainwater, by an ARMAX identification method and predicting the inflow volume of rainwater based on the prediction model. The type also includes a kinematic-wave method. Herein, the RRL method and the kinematic-wave method are called white-box-models. On the other hand, the ARMAX identification method is called a black-box-model.

The RRL method is a method for calculating the inflow volume of rainwater, which was developed by the England Road Laboratory. The RRL method is explained hereinafter.

In the RRL method, a duct chart (Sewer Network Diagram) is made wherein hydraulic features of ducts in an objective area, for example respective lengths, respective diameters and respective inclinations of the ducts, are written. Then, assuming that the whole duct chart is a single basin, a lowermost point of the basin is selected as a point p for calculating an inflow volume. Then, flow rates in main collecting ducts, open ducts and so on are calculated. Then, the so-called time-area curves are defined and written in such a manner that a time flowing between each two of neighboring curves of the rainwater toward the point p is equal to a time necessary to calculate an inflow volume of rainwater. Areas divided by the time-area curves are calculated as time-differentiating-areas $A_i[m^2]$. Thus, a time-area chart is made. The above operations are conducted manually.

Then, a rainfall curve (chart) is defined and written based on rainfall intensities $I_i[mm/s]$ in the basin for respective unit times i for calculating the inflow volume. A flowing coefficient C that represents a flowing ratio is given as a fixed value defined from a using condition of the ground in the basin. A provisional inflow volume of rainwater Pi is calculated from the made rainfall curve and the made time-area chart, according to the following equation (1).

$$Pi = \sum_{k=1}^{n} \{C \times I_{i-k+1} \times A_k\} \qquad (1)$$

In general, the rainwater generated by the rainfall does not immediately flow into the facility, but is temporarily stored in the ducts and flows into the facility after that. Thus, the inflow volume of rainwater is calculated by substituting the provisional inflow volume of rainwater Pi for an equation representing a relationship between the stored amount of rainwater and the inflow volume of rainwater. The equation representing the relationship between the stored amount of rainwater and the inflow volume of rainwater is explained as below.

$$S(t)=KQ(t)_n \qquad (2)$$

(K, n: CONSTANTS OF THE BASIN)

$$\frac{dS(t)}{dt} = P(t) - Q(t) \qquad (3)$$

$\begin{cases} S: \text{STORED AMOUNT } [m^3] \\ P: \text{PROVISIONAL INFLOW VOLUME } [m^3/s] \\ Q: \text{INFLOW VOLUME } [m^3/s] \end{cases}$ The equation (2) is called a kinematics (motion) equation. The equation (3) is called a continuity equation. Usually, the following equation (4) which is obtained by differentiating the equation (3) is used for calculating the inflow volume of rainwater.

$$Q_i + \frac{2}{\Delta t}S_i = (Pi + Pi - 1) - Q_{i-1} + \frac{2}{\Delta t}S_{i-1} \quad (4)$$

($\Delta t$: differential time)

The inflow volume of rainwater calculated by the above manner is finally determined as an inflow volume of rainwater Qi of the point p for calculating the inflow volume of rainwater.

In addition, there is a modified RRL method wherein a point (view) of effective rainfall, wherein a pervious area and an impervious area is divided, is added to the RRL method. In the modified RRL method, the relationship between the stored amount of rainwater and the inflow volume of rainwater is modified with respect to the RRL method. Concerning the basic processes, the modified RRL method is similar to the RRL method. Furthermore, there is an expanded RRL method wherein the point of effective rainfall is modified with respect to the modified RRL method, and wherein points of introducing a function depending on a time and of dividing the basin are added to the modified RRL method.

Next, the ARMAX identification method is explained as below.

In the ARMAX method, a transfer function model as shown in FIG. 11 is defined as a function representing a relationship between the rainfall volume and the inflow volume of rainwater. In FIG. 11, u represents data of the rainfall volume, y represents data of the inflow volume of rainwater, and e represents a measurement error that can not be observed. In addition, the equations (5), (6) and (7) are satisfied.

$$A(z) = a_n z^n + a_{n-1} z^{n-1} + \ldots + a_0 \quad (5)$$

$$B(z) = b_m z^m + b_{m-1} z^{m-1} + \ldots + b_0 \quad (6)$$

$$C(z) = c_l z^l + c_{l-1} z^{l-1} + \ldots + c_0 \quad (7)$$

Then, coefficient parameters in the equations (5) to (7) are determined by using some data of the rainfall volume and some data of the inflow volume of rainwater for a past time before a predicting time, for example by a least square method, in such a manner that the relationship between the rainfall volume and the inflow volume of rainwater among u to y in FIG. 11 may be nearest to a real relationship between them. The model shown in FIG. 11 using the determined parameters is determined as a predicting model.

Then, data of predicted rainfall-volume at a time when it is desired to predict are inputted into the predicting model to calculate (predict) the inflow volume of rainwater. A calculated (predicted) result by using the ARMAX model and an actual result are shown together in FIG. 12.

The described RRL method has following problems. That is, the duct chart, the time-area curves and time-area chart have to be made (written) for each basin, which needs much labor. In addition, besides the data of amount of the rainfall and the data of the inflow volume of rainwater for the past time, data about the ducts for making the duct chart for each basin and data about the using conditions on the ground for calculating the flowing coefficient C have to be collected, which needs more labor. A processing operation for incorporating the collected data into a processing system needs much labor. In addition, as the determination of the flowing coefficient C and so on may tend to be arbitrary, the accuracy of the prediction may be uncertain. The described modified RRL method and the described expanded RRL method also have the similar problems about determining the flowing coefficient C.

On the other hand, the ARMAX method does not need the labor that is needed by the RRL method. However, the accuracy of the prediction with the ARMAX model may be low because the ARMAX model does not reflect a non-linear phenomenon that is learned by experience. For example, an inflow volume of rainwater in hard raining or in light raining may be not proportional to the rainfall volume. In addition, in urban areas, there is a non-linearity wherein the inflow volume of rainwater increases rapidly as the rainfall volume increases. Furthermore, although the ARMAX model can be identified accurately when a white signal (noise) is inputted, it is uncertain that the ARMAX model may be identified accurately when the data of the rainfall volume and the data of the inflow volume of rainwater are inputted.

SUMMARY OF THE INVENTION

The object of this invention is to solve the above problems, that is, to provide a predicting system and a predicting method configured to predict an inflow volume of rainwater, which can predict the inflow volume of rainwater flowing into an objective facility with a high accuracy even if a non-linear relationship may happen between a rainfall volume and the inflow volume of rainwater.

In order to achieve the object, the present invention is featured by the character that a predicting system configured to predict an inflow volume of rainwater, includes:

a rainfall volume measuring unit for measuring a rainfall volume that has fallen by a present time, a rainfall volume predicting unit for predicting a rainfall volume in a future, an inflow-volume measuring unit for measuring an inflow volume of rainwater that has flown into an objective facility by the present time, a model identification unit having a non-linear model having a Neural-Network model for calculating an inflow volume of rainwater from a rainfall volume, and a parameter determining part for determining a degree and coefficient parameters of the non-linear model, based on the rainfall volume that has fallen by the present time measured by the rainfall volume measuring unit and the inflow volume of rainwater that has flown into the objective facility by the present time measured by the inflow-volume measuring unit, and an inflow-volume predicting unit for predicting an inflow volume of rainwater flowing into the objective facility in the future, based on the rainfall volume in the future predicted by the rainfall volume predicting unit, according to the non-linear model determined by the model identification unit.

In addition, the present invention is featured by the character that a method for predicting an inflow volume of rainwater flowing into an objective facility by using a predicting system configured to predict an inflow volume of rainwater, including:

a rainfall volume measuring unit for measuring a rainfall volume that has fallen by a present time, a rainfall volume predicting unit for predicting a rainfall volume in a future, an inflow-volume measuring unit for measuring an inflow volume of rainwater that has flown into an objective facility by the present time, a model identification unit having a non-linear model having a Neural-Network model for calculating an inflow volume of rainwater from a rainfall volume, and a parameter determining part for determining a degree and coefficient parameters of the non-linear model, based on the rainfall volume that has fallen by the present time measured by the rainfall volume measuring unit and the inflow volume of rainwater that has flown into the objective facility by the present time measured by the inflow-volume measuring unit, and an inflow-volume predicting unit for predicting an inflow volume of rainwater flowing into the objective facility in the future, based on the rainfall volume in the future predicted by the rainfall volume predicting unit, according to the non-linear model determined by the model identification unit; includes:

a step of determining the degree and the coefficient parameters of the non-linear model by the parameter determining part, based on the rainfall volume that has fallen by the present time measured by the rainfall volume measuring unit and the inflow volume of rainwater that has flown into the objective facility by the present time measured by the inflow-volume measuring unit, and a step of predicting the inflow volume of rainwater flowing into the objective facility in the future, based on the rainfall volume in the future predicted by the rainfall volume predicting unit, according to the non-linear model determined by the model identification unit, by the inflow-volume predicting unit.

According to the features, the inflow volume of rainwater corresponding to the rainfall volume in the future is predicted by using the non-linear model having the Neural-Network model, whose degree and whose coefficient parameters are determined by the parameter determining part based on the rainfall volume that has fallen by the present time and the inflow volume of rainwater that has flown into the objective facility by the present time. Thus, the inflow volume of rainwater can be predicted with a high accuracy, even if a non-linear relationship may happen between the rainfall volume and the inflow volume of rainwater.

Preferably, the rainfall volume measuring unit is adapted to respectively measure amounts of rainfall that have fallen for respective unit times by the present time, the inflow-volume measuring unit is adapted to respectively measure inflow volumes of rainwater that have flown into the objective facility for respective unit times by the present time, and the parameter determining part is adapted to determine the degree and the coefficient parameters of the non-linear model, based on a plurality of data of the amounts of rainfall that have fallen for the respective unit times by the present time measured by the rainfall volume measuring unit and a plurality of data of the inflow volumes of rainwater that have flown into the objective facility for the respective unit times by the present time measured by the inflow-volume measuring unit.

Preferably, the rainfall volume measuring unit is connected to a rainfall volume data picking-up unit which is adapted to pick up only necessary data of the amounts of rainfall, from the plurality of data of the amounts of rainfall that have fallen for the respective unit times by the present time measured by the rainfall volume measuring unit, and the inflow-volume measuring unit is connected to an inflow-volume data picking up unit which is adapted to pick up only data of the inflow volumes of rainwater corresponding to the picked up data of the amounts of rainfall, from the plurality of data of the inflow volumes of rainwater that have flown into the objective facility for the respective unit times by the present time measured by the inflow-volume measuring unit.

Preferably, the model identification unit has an efficient-rainfall-volume calculating part for calculating a contributing rainfall-volume to an inflow volume of rainwater flowing into the objective facility, based on a preceding rainfall, and the parameter determining part is adapted to determine the degree and the coefficient parameters of the non-linear model, based on the contributing rainfall-volume calculated by the efficient-rainfall-volume calculating part and the inflow volume of rainwater that has flown into the objective facility by the present time measured by the inflow-volume measuring unit.

Preferably, at least one of the rainfall volume measuring unit and the inflow-volume measuring unit has a noise reducing part.

Preferably, a plurality of rainfall volume measuring units are arranged in an area covered by the objective facility, for measuring a plurality of data of amounts of rainfall, the rainfall volume predicting unit is adapted to predict a plurality of data of amounts of rainfall in a future, said plurality of data of the amounts of rainfall corresponding to the plurality of rainfall volume measuring units respectively, the non-linear model is a model into which a plurality of data are inputted, the parameter determining part is adapted to determine the degree and the coefficient parameters of the non-linear model into which the plurality of data are inputted, based on the plurality of data of the amounts of rainfall measured by the plurality of rainfall volume measuring units and the inflow volume of rainwater that has flown into the objective facility by the present time measured by the inflow-volume measuring unit, and the inflow-volume predicting unit is adapted to predict the inflow volume of rainwater flowing into the objective facility in the future, based on the plurality data of the amounts of rainfall in the future predicted by the rainfall volume predicting unit, according to the non-linear model determined by the model identification unit.

Preferably, the parameter defining part has a program constructed by an algorithm using a least square method.

In addition, the present invention is featured by the character that a predicting system configured to predict an inflow volume of rainwater, includes:

a predicting system configured to predict an inflow volume of rainwater, comprising:

a rainfall volume measuring unit for measuring a rainfall volume that has fallen by a present time, a rainfall volume predicting unit for predicting a rainfall volume in a future, an inflow-volume measuring unit for measuring an inflow volume of rainwater that has flown into an objective facility by the present time, a model identification unit having
an efficient-rainfall-volume calculating part for calculating a contributing rainfall-volume to an inflow volume of rainwater flowing into the objective facility, based on a preceding rainfall and a non-linear model,
a linear model for calculating an inflow volume of rainwater from a rainfall volume, and
a parameter determining part for determining a degree and coefficient parameters of the linear model, based on the contributing rainfall-volume calculated by the efficient-rainfall-volume calculating part and the inflow volume of rainwater that has flown into the objective facility by the present time measured by the inflow-volume measuring unit, and an inflow-volume predicting unit for predicting an inflow volume of rainwater flowing into the objective facility in the future, based on the rainfall volume in the future predicted by the rainfall volume predicting unit, according to the linear model determined by the model identification unit.

In addition, the present invention is featured by the character that a method for predicting an inflow volume of rainwater flowing into an objective facility by using a predicting system configured to predict an inflow volume of rainwater, including:

a rainfall volume measuring unit for measuring a rainfall volume that has fallen by a present time, a rainfall volume predicting unit for predicting a rainfall volume in a future, an inflow-volume measuring unit for measuring an inflow volume of rainwater that has flown into an objective facility by the present time, a model identification unit having
an efficient-rainfall-volume calculating part for calculating a contributing rainfall-volume to an inflow volume of rainwater flowing into the objective facility, based on a preceding rainfall and a non-linear model, a linear model for calculating an inflow volume of rainwater from a rainfall volume, and a parameter determining part for determining a degree and coefficient parameters of the linear model, based on the contributing rainfall-volume calculated by the efficient-rainfall-volume calculating part and the inflow volume of rainwater that has flown into the objective facility by the present time measured by the inflow-volume measuring unit, and an inflow-volume predicting unit for predicting an inflow volume of rainwater flowing into the objective facility in the future, based on the rainfall volume in the future predicted by the rainfall volume predicting unit, according to the linear model determined by the model identification unit; includes:

a step of calculating the contributing rainfall-volume to the inflow volume of rainwater flowing into the objective facility based on the preceding rainfall and the non-linear model, by the efficient-rainfall-volume calculating part, a step of determining the degree and the coefficient parameters of the linear model, based on the contributing rainfall-volume calculated by the efficient-rainfall-volume calculating part and the inflow volume of rainwater that has flown into the objective facility by the present time measured by the inflow-volume measuring unit, by the parameter determining part, and a step of predicting the inflow volume of rainwater flowing into the objective facility in the future, based on the rainfall volume in the future predicted by the rainfall volume predicting unit, according to the linear model determined by the model identification unit, by the inflow-volume predicting unit.

According to the features, the efficient-rainfall-volume calculating part calculates the contributing rainfall-volume to the inflow volume of rainwater based on the preceding rainfall and the non-linear model, the parameter determining part determines the degree and the coefficient parameters of the linear model based on the contributing rainfall-volume and the inflow volume of rainwater, and the inflow volume of rainwater corresponding to the rainfall volume in the future is predicted by using the linear model. Thus, the inflow volume of rainwater flowing into the objective facility can be predicted with a high accuracy.

Preferably, the parameter defining part has a program constructed by an algorithm using a least square method.

In addition, the present invention is featured by the character that a predicting system configured to predict an inflow volume of rainwater, includes:

a rainfall volume measuring unit for measuring a rainfall volume that has fallen by a present time, an inflow-volume measuring unit for measuring an inflow volume of rainwater that has flown into an objective facility by the present time, a model identification unit having
a non-linear model for calculating an inflow volume of rainwater from a rainfall volume, and a parameter determining part for determining a degree and coefficient parameters of the non-linear model, based on the rainfall volume that has fallen by the present time measured by the rainfall volume measuring unit and the inflow volume of rainwater that has flown into the objective facility by the present time measured by the inflow-volume measuring unit, and an inflow-volume predicting unit for predicting an inflow volume of rainwater flowing into the objective facility in the future, based on the rainfall volume that has fallen by the present time measured by the rainfall volume measuring unit, according to the non-linear model determined by the model identification unit.

In addition, the present invention is featured by the character that a method for predicting an inflow volume of rainwater flowing into an objective facility by using a predicting system configured to predict an inflow volume of rainwater, including:

a rainfall volume measuring unit for measuring a rainfall volume that has fallen by a present time, an inflow-volume measuring unit for measuring an inflow volume of rainwater that has flown into an objective facility by the present time, a model identification unit having
a non-linear model for calculating an inflow volume of rainwater from a rainfall volume, and a parameter determining part for determining a degree and coefficient parameters of the non-linear model, based on the rainfall volume that has fallen by the present time measured by the rainfall volume measuring unit and the inflow volume of rainwater that has flown into the objective facility by the present time measured by the inflow-volume measuring unit, and an inflow-volume predicting unit for predicting an inflow volume of rainwater flowing into the objective facility in the future, based on the rainfall volume that has fallen by the present time measured by the rainfall volume measuring unit, according to the non-linear model determined by the model identification unit; includes:

a step of determining the degree and the coefficient parameters of the non-linear model, based on the rainfall volume that has fallen by the present time measured by the rainfall volume measuring unit and the inflow volume of rainwater that has flown into the objective facility by the present time measured by the inflow-volume measuring unit, by the parameter determining part, and a step of predicting the inflow volume of rainwater flowing into the objective facility in the future, based on the rainfall volume that has fallen by the present time measured by the rainfall volume measuring unit, according to the non-linear model determined by the model identification unit, by the inflow-volume predicting unit.

According to the features, the inflow volume of rainwater in the future is predicted from the rainfall volume that has fallen by the present time by using the non-linear model, whose degree and whose coefficient parameters are determined by the parameter determining part based on the rainfall volume that has fallen by the present time and the inflow volume of rainwater that has flown into the objective facility by the present time. Thus, the inflow volume of rainwater in near future can be easily predicted with a high accuracy.

Preferably, a plurality of rainfall volume measuring units are arranged in an area covered by the objective facility, for measuring a plurality of data of amounts of rainfall, the non-linear model is a model into which a plurality of data are inputted, the parameter determining part is adapted to determine the degree and the coefficient parameters of the non-linear model into which the plurality of data are inputted, based on the plurality of data of the amounts of rainfall measured by the plurality of rainfall volume measuring units and the inflow volume of rainwater that has flown into the objective facility by the present time measured by the inflow-volume measuring unit, and the inflow-volume predicting unit is adapted to predict the inflow volume of rainwater flowing into the objective facility in the future, based on the plurality of data of the amounts of rainfall that has fallen by the present time measured by the plurality of rainfall volume measuring units, according to the non-linear model determined by the model identification unit.

In addition, the present invention is featured by the character that a predicting system configured to predict an inflow volume of rainwater, includes:

a rainfall volume measuring unit for measuring a rainfall volume that has fallen by a present time, an inflow-volume measuring unit for measuring an inflow volume of rainwater that has flown into an objective facility by the present time, a model identification unit having
    an efficient-rainfall-volume calculating part for calculating a contributing rainfall-volume to an inflow volume of rainwater flowing into the objective facility, based on a preceding rainfall and a non-linear model,
    a linear model for calculating an inflow volume of rainwater from a rainfall volume, and
    a parameter determining part for determining a degree and coefficient parameters of the linear model, based on the contributing rainfall-volume calculated by the efficient-rainfall-volume calculating part and the inflow volume of rainwater that has flown into the objective facility by the present time measured by the inflow-volume measuring unit, and an inflow-volume predicting unit for predicting an inflow volume of rainwater flowing into the objective facility in the future, based on the rainfall volume that has fallen by the present time measured by the rainfall volume measuring unit, according to the linear model determined by the model identification unit.

In addition, the present invention is featured by the character that a method for predicting an inflow volume of rainwater flowing into an objective facility by using a predicting system configured to predict an inflow volume of rainwater, including:

a rainfall volume measuring unit for measuring a rainfall volume that has fallen by a present time, an inflow-volume measuring unit for measuring an inflow volume of rainwater that has flown into an objective facility by the present time, a model identification unit having
    an efficient-rainfall-volume calculating part for calculating a contributing rainfall-volume to an inflow volume of rainwater flowing into the objective facility, based on a preceding rainfall and a non-linear model,
    a linear model for calculating an inflow volume of rainwater from a rainfall volume, and
    a parameter determining part for determining a degree and coefficient parameters of the linear model, based on the contributing rainfall-volume calculated by the efficient-rainfall-volume calculating part and the inflow volume of rainwater that has flown into the objective facility by the present time measured by the inflow-volume measuring unit, and an inflow-volume predicting unit for predicting an inflow volume of rainwater flowing into the objective facility in the future, based on the rainfall volume that has fallen by the present time measured by the rainfall volume measuring unit, according to the linear model determined by the model identification unit; includes:

a step of calculating the contributing rainfall-volume to the inflow volume of rainwater flowing into the objective facility based on the preceding rainfall and the non-linear model, by the efficient-rainfall-volume calculating part, a step of determining the degree and the coefficient parameters of the linear model, based on the contributing rainfall-volume calculated by the efficient-rainfall-volume calculating part and the inflow volume of rainwater that has flown into the objective facility by the present time measured by the inflow-volume measuring unit, by the parameter determining part, and a step of predicting the inflow volume of rainwater flowing into the objective facility in the future, based on the rainfall volume that has fallen by the present time measured by the rainfall volume measuring unit, according to the linear model determined by the model identification unit, by the inflow-volume predicting unit.

According to the features, the efficient-rainfall-volume calculating part calculates the contributing rainfall-volume to the inflow volume of rainwater based on the preceding rainfall and the non-linear model, the parameter determining part determines the degree and the coefficient parameters of the linear model based on the contributing rainfall-volume and the inflow volume of rainwater, and the inflow volume of rainwater in the future is predicted from the rainfall volume that has fallen by the present time by using the linear model. Thus, the inflow volume of rainwater in near future can be easily predicted with a high accuracy.

DETAILED DESCRIPTION OF THE INVENTION

Embodiments of the invention will now be described in more detail with reference to drawings.

Figure 1:
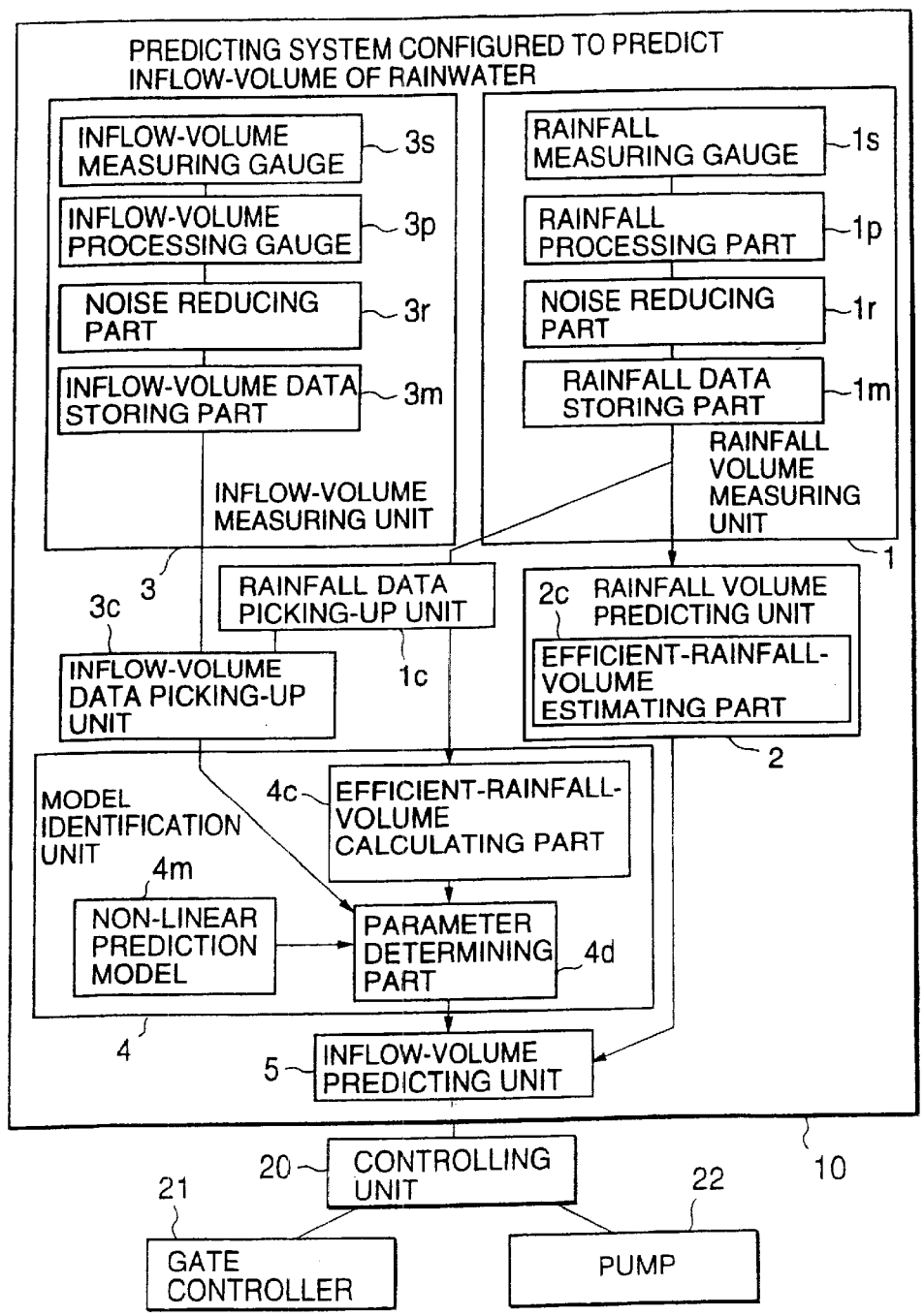
FIG. 1 is a schematic block diagram of a first embodiment of a predicting system configured to predict an inflow volume of rainwater according to the invention.

FIG. 1 is a schematic block diagram of a first embodiment of a predicting system configured to predict an inflow volume of rainwater according to the invention. As shown in FIG. 1, the predicting system 10 of the first embodiment includes a rainfall volume measuring unit 1 for measuring a rainfall volume that has fallen by a present time and an inflow-volume measuring unit 3 for measuring an inflow volume of rainwater that has flown into an objective facility by the present time. The rainfall volume measuring unit 1 is connected to a rainfall volume predicting unit 2. The rainfall volume predicting unit 2 is adapted to predict a rainfall volume in a future based on the rainfall volume that has fallen by the present time measured by the rainfall volume measuring unit 1, for example by a linear predicting method.

The rainfall volume measuring unit 1 and the inflow-volume measuring unit 3 are also connected to a model identification unit 4. The model identification unit 4 has a non-linear prediction model 4m having a Neural-Network model for calculating an inflow volume of rainwater from a rainfall volume, and a parameter determining part 4d for determining a degree and coefficient parameters of the non-linear prediction model 4m, based on the rainfall volume that has fallen by the present time measured by the rainfall volume measuring unit 1 and the inflow volume of rainwater that has flown into the objective facility by the present time measured by the inflow-volume measuring unit 3.

The model identification unit 4 is connected to an inflow-volume predicting unit 5. The inflow-volume predicting unit 5 is adapted to predict an inflow volume of rainwater flowing into the objective facility in the future, based on the rainfall volume in the future predicted by the rainfall volume predicting unit 2, according to the non-linear prediction model determined by the model identification unit 4.

In the first embodiment, as shown in FIG. 1, the rainfall volume measuring unit 1 has: a plurality of rainfall volume measuring gauges is arranged in an area corresponding to (covered by) the objective facility, a rainfall volume processing part 1p for converting physical data obtained by the rainfall volume measuring gauges is into data of amounts of rainfall for respective unit times, a noise reducing part 1r for removing noise components from the data of amounts of rainfall processed by the rainfall volume processing part 1p and a rainfall volume data storing part 1m for storing the data of amounts of rainfall removed the noise components with respect to for the respective unit times.

Figure 2:
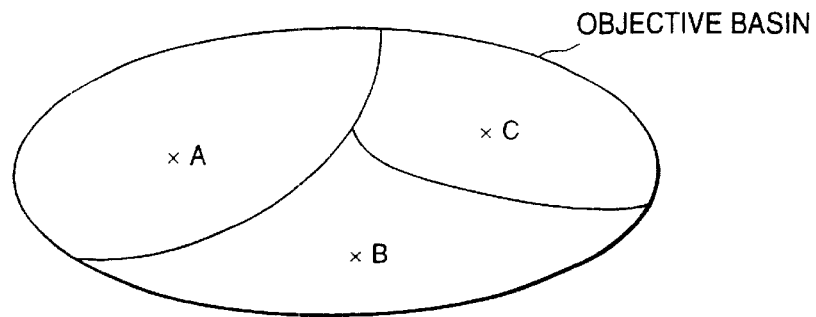
FIG. 2 is an explanatory view of an example of arrangement of the rainfall volume measuring gauges shown in FIG. 1.
Figures 3A, 3B:
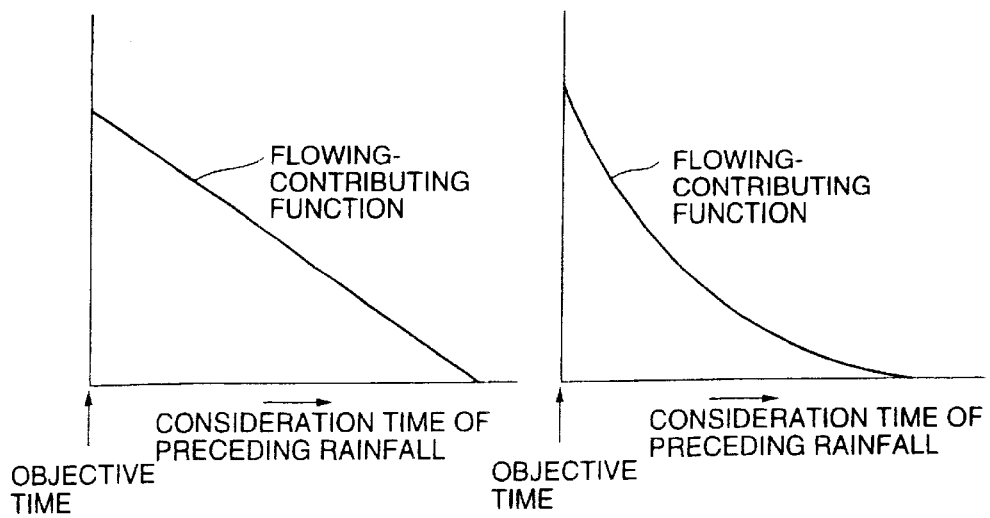
FIG. 3 is graphs showing examples of flowing-contributing-functions used by the efficient-rainfall-volume calculating part.

In general, each of the plurality of rainfall volume measuring gauges 1s consists of a rainfall gauge on the ground or a laser rainfall gauge. For example, as shown in FIG. 2, the plurality of rainfall volume measuring gauges 1s are arranged at substantially center positions A, B, C of partial areas, into which an objective basin (an area corresponding to the objective facility) is divided substantially equally.

The rainfall volume processing part 1p is electrically connected to each of the plurality of rainfall volume measuring gauges 1s via transmitting and receiving instruments such as telemeters.

The noise reducing part 1r consists of a digital low-pass filter. The digital low-pass filter is designed based on a digital cutoff frequency $\omega_d$. That is, when a sampling period of the data is T, an analog frequency $\omega_a=\tan(\omega_d \cdot T)$ is calculated, an analog filter H(s) with respect to the frequency $\omega_a$ is designed, a bilinear transformation $s=(z-1)/(z+1)$ is conducted to the filter H(s), and a digital filter $$Hd(z) = H(s)\bigg|S = \frac{z-1}{z+1}$$

is designed. Alternatively, as a simpler method, a method of adding up a predetermined number of data measured every the sampling period T (for example adding up five data measured every 1 minute) may be adopted.

As shown in FIG. 1, the inflow-volume measuring unit 3 has: an inflow-volume measuring gauge 3s arranged at an inlet portion of the objective facility such as a pump facility or a storing duct, an inflow-volume processing part 3p for converting physical data obtained by the inflow-volume measuring gauge 3s into data of inflow volumes for respective unit times, a noise reducing part 3r for removing noise components from the data of inflow volumes processed by the inflow-volume processing part 3p and an inflow-volume data storing part 3m for storing the data of inflow volumes removed the noise components with respect to for the respective unit times.

The inflow-volume measuring gauge 3s consists of an inflow volume gauge or a water gauge. The inflow-volume processing part 3p is electrically connected to the inflow-volume measuring gauge 3s via a transmitting and receiving instrument such as a telemeter. The noise reducing part 3r is substantially similar to the noise reducing part 1r.

The rainfall volume data storing part 1m is connected to a rainfall volume data picking-up unit 1c. The rainfall volume data picking-up unit 1c is adapted to define (select) a combination (a data row) of data of the amounts of rainfall for example from a starting of a raining to an end of the raining (to a suspension of the raining), from the plurality of data of the amounts of rainfall stored with respect to for the respective unit times. The rainfall volume data picking-up unit 1c is also adapted to pick up necessary combinations from a plurality of the defined combinations of data of the amounts of rainfall based on a suitable condition. The suitable condition for picking up the combinations of data of the amounts of rainfall may be preferably set in such a manner that the picked up combinations of data of the amounts of rainfall have very different peak values each other, or in such a manner that the picked up combinations of data of the amounts of rainfall have very different data patterns each other. The inflow-volume data storing part $3m$ is connected to an inflow-volume data picking-up unit $3c$ which is adapted to pick up combinations of data of the inflow volumes of rainwater corresponding to the combinations of data of the mounts of rainfall picked up by the rainfall volume data picking-up unit $1c$.

The model identification unit 4 has an efficient-rainfall-volume calculating part $4c$, which is adapted to calculate respective contributing amounts of rainfall to the inflow volumes of rainwater flowing into the objective facility, based on respective preceding rainfalls for respective predetermined consideration times of the preceding rainfalls before the objective times, from the data of the amounts of rainfall picked up by the rainfall volume data picking-up unit $1c$ of the rainfall volume measuring unit 1. In detail, the efficient-rainfall-volume calculating part $4c$ is adapted to calculate the contributing amounts of rainfall by attaching greater importance to the preceding rainfalls nearer to the objective times, in more detail by multiplying the preceding rainfalls for the predetermined consideration times of the preceding rainfalls before the objective times by a flowing-contributing function such as functions shown in FIGS. $3(a)$ and $3(b)$. The calculating of the contributing amounts of rainfall is independently conducted for each of all the combinations of data of the amounts of rainfall picked up by the rainfall volume data picking-up unit $1c$.

The parameter determining part $4d$ is adapted to determine the degree and the coefficient parameters of the non-linear prediction model $4m$ having the Neural-Network model, based on the plurality of contributing amounts of rainfall calculated by the efficient-rainfall-volume calculating part $4c$ and the combinations of data of the inflow volumes of rainwater picked up by the inflow-volume data picking-up unit $3c$ of the inflow-volume measuring unit 3.

The non-linear prediction model $4m$ of the first embodiment is a model into which a plurality of data are inputted. The non-linear prediction model $4m$ consists of a linear transfer function and a Neural-Network model thereafter. For example, the linear transfer function may consist of a shift-operator that shifts inputted data by a suitable time in order to give a dynamics with respect to time.

Figure 4:
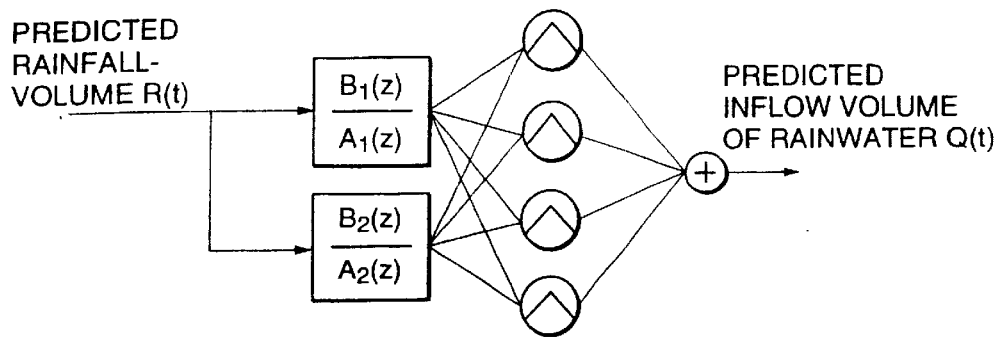
FIG. 4 is an explanatory view of the non-linear model of FIG. 1.

FIG. 4 shows a non-linear prediction model $4m$ adopting a Radial-Basis-Function model as an example of the Neural Network model. In FIG. 4, n and m are degrees, $a_{1i}$, $b_{1i}$, $a_{2i}$, $b_{2i}$, $c_i$ and $d_i$ are parameters. In addition, $\|\cdot\|$ represent a vector norm. The Radial-Basis-Function of FIG. 4 calculates a predicted inflow volume Q(t) by multiplying a weight coefficient $G_i$. The weight coefficient $G_i$ may be estimated by a least square method. In addition, as the Neural-Network model, a Multi-Layer-Neural-Network model and so on may be used.

In addition, the rainfall volume predicting unit 2 is adapted to predict a plurality of data of amounts of rainfall in the future, which correspond to the plurality of rainfall volume measuring units 1 respectively, based on the data of the amounts of rainfall measured by the plurality of rainfall volume measuring units 1 respectively. In addition, the rainfall volume predicting unit 2 has an efficient-rainfall-volume estimating part $2c$, which is adapted to estimate a plurality of contributing amounts of rainfall in the future based on the predicted plurality of data of the amounts of rainfall in the future. The calculation of the efficient-rainfall-volume estimating part $2c$ is substantially similar to the calculation of the contributing-rainfall-volume volume processing part $4c$ that is explained above with reference to FIGS. $3(a)$ and $3(b)$.

The inflow-volume predicting unit 5 is adapted to predict an inflow volume of rainwater flowing into the objective facility in the future, based on the plurality of contributing amounts of rainfall in the future (which are based on the predicted data of the amounts of rainfall), according to the non-linear model determined by the model identification unit 4.

The predicting system 10 is connected to a gate controller 21 for gates to main sewage ducts, storing ducts or storing ponds, or connected to pumps 22 in a pump facility, via a controlling unit 20.

The predicting system 10 of this embodiment operates as follows.

In the predicting system 10, each of the plurality of rainfall volume measuring gauges is of the rainfall volume measuring unit 1 measures amounts of rainfall. The rainfall volume processing part $1p$ converts the physical data obtained by the rainfall volume measuring gauges is into the data of amounts of rainfall. The noise reducing part $1r$ functions as a low-pass filter to remove the noise components from the data of the amounts of rainfall processed by the rainfall volume processing part $1p$. The rainfall volume data storing part $1m$ stores the data of the amounts of rainfall removed the noise components. The rainfall volume data picking-up unit $1c$ defines and picks up the combinations of data of the amounts of rainfall from the plurality of data of the amounts of rainfall stored in the rainfall volume data storing part $1m$, based on the suitable condition.

The inflow-volume measuring gauge $3s$ of the inflow-volume measuring unit 3 measures inflow volumes of rainwater. The inflow-volume processing part $3p$ converts the physical data obtained by the inflow-volume measuring gauge $3s$ into data of inflow volumes. The noise reducing part $3r$ functions as a low-pass filter to remove the noise components from the data of the inflow volumes processed by the inflow-volume processing part $3p$. The inflow-volume data storing part $3m$ stores the data of the inflow volumes removed the noise components. The inflow-volume data picking up unit $3c$ retrieves and picks up the combinations of data of the inflow volumes of rainwater corresponding to the combinations of data of the amounts of rainfall picked up by the rainfall volume data picking-up unit $1c$, from the data of the inflow volumes stored in the inflow-volume data storing part $3m$.

Next, the efficient-rainfall-volume calculating part $4c$ of the model identification unit $4c$ calculates the respective contributing amounts of rainfall to the inflow volumes of rainwater with attaching greater importance to the preceding rainfalls nearer to the objective times, based on the respective picked up data of the amounts of rainfall, by multiplying the preceding rainfalls for the predetermined consideration times of the preceding rainfalls before the objective times by the flowing-contributing function such as the function shown in FIG. $3(a)$ or $3(b)$.

Then, the parameter determining part $4d$ determines the degrees and the coefficient parameters of the non-linear prediction model $4m$, based on the plurality of contributing amounts of rainfall calculated by the efficient-rainfall-volume calculating part $4c$ and the combinations of data of the inflow volumes of rainwater flowing into the objective facility measured by the inflow-volume measuring gauge $3s$ and picked up by the inflow-volume data picking-up unit $3c$.

When the non-linear model 4m is the model shown in FIG. 4, the degrees n and m of the transfer function of the non-linear model 4m are estimated for example by an AIC (AKAIKE Information Criterion). Then, the parameters $a_{1i}$, $b_{1i}$, $a_{2i}$, $b_{2i}$, $c_i$ and $d_i$ (wherein i corresponds to the number of parameters) are estimated in such a manner that the model is nearest to a relationship between the contributing amounts of rainfall and the data of the inflow volumes of rainwater before the objective time for predicting. The estimating method is for example a least square method. Thus, the degrees and the coefficient parameters of the non-linear model 4m are determined, that is, the prediction model is defined and determined.

In addition, the rainfall volume predicting unit 2 predicts the plurality of data of the amounts of rainfall in the future, which correspond to the plurality of rainfall volume measuring gauges 1s respectively, based on the data of the amounts of rainfall measured by the plurality of rainfall volume measuring gauges is respectively. Herein, the efficient-rainfall-volume estimating part 2c of the rainfall volume predicting unit 2 estimates the plurality of contributing amounts of rainfall in the future, based on the predicted plurality of data of the amounts of rainfall in the future, substantially similarly to the contributing-rainfall-volume volume processing part 4c.

Then, the inflow-volume predicting unit 5 calculates and predicts the inflow volume of rainwater flowing into the objective facility in the future, based on the plurality of contributing amounts of rainfall in the future, according to the prediction model determined by the model identification unit 4.

Owing to the calculated and predicted inflow volume, the gate controller 21 for the gates to the main sewage ducts, the storing ducts or the storing ponds are controlled, and the number of the pumps 22 in the pump facility to be operated is determined, via the controlling unit 20.

Figure 5:
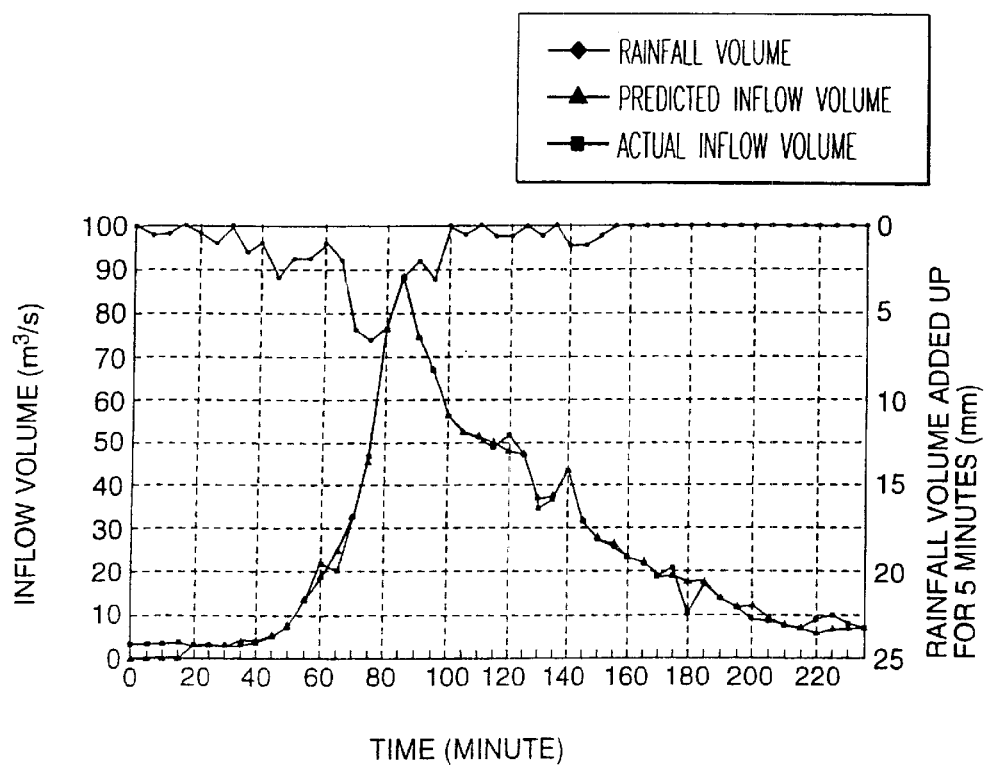
FIG. 5 is a graph showing a predicted amount by the predicting system of FIG. 1 and an actual amount together.
Figure 12:
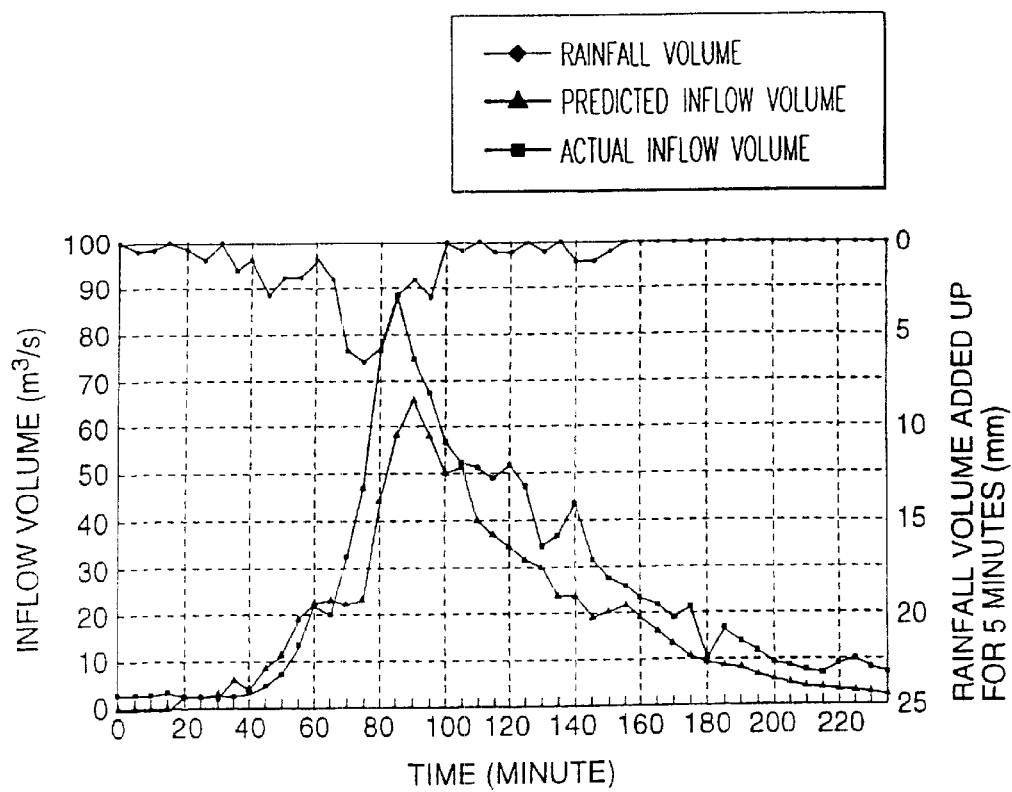
FIG. 12 is a graph showing a predicted amount by using the ARMAX model shown in FIG. 11 and an actual amount together.

A predicted amount and an actual amount of the inflow volume are shown in FIG. 5 together, the predicted amount being obtained by the predicting system wherein the non-linear model 4m consists of a combination of the linear transfer function and the Multi-Layer-Neural-Network model (an example of the Neural-Network model). The rainfall conditions of the FIG. 5 are similar to those of FIG. 12. As shown in FIG. 5, the accuracy of the prediction of the inflow volume of rainwater is apparently improved, compared with the case shown in FIG. 12.

As described above, according to the first embodiment, since the relationship between the rainfall volume and the inflow volume of rainwater is represented by the non-linear prediction model 4m having the Neural-Network model, the inflow volume of rainwater flowing into the objective facility can be predicted with a high accuracy, even if a non-linear relationship may happen between the rainfall volume and the inflow volume of rainwater.

In addition, according to the first embodiment, since the objective basin is divided into the plurality of partial areas and the plurality of data inputting are adopted, the influence by the difference in the rainfall conditions of the partial areas (by the non-uniformity of rainfall) can be reflected in the prediction. Thus, the inflow volume of rainwater flowing into the objective facility can be predicted with a high accuracy.

In addition, according to the first embodiment, since the rainfall volume measuring unit 1 and the inflow-volume measuring unit 3 have the noise reducing units 1r and 3r respectively, measuring errors of high frequencies may be removed. Thus, unevenness of the prediction of the inflow volume may be reduced so that the reliability of the prediction may be improved. In addition, the speed and the accuracy of the calculation for the parameters of the prediction model 4m may be improved.

Furthermore, according to the first embodiment, the contributing-rainfall-volume volume processing part 4c or the efficient-rainfall-volume estimating part 2c takes the influence of the preceding rainfall into consideration in the prediction of the inflow volume. Thus, the difference in the inflow volumes in the same rainfall condition caused by the difference of the preceding rainfall conditions, which is learned by experience, may be predicted with a high accuracy.

Figure 6:
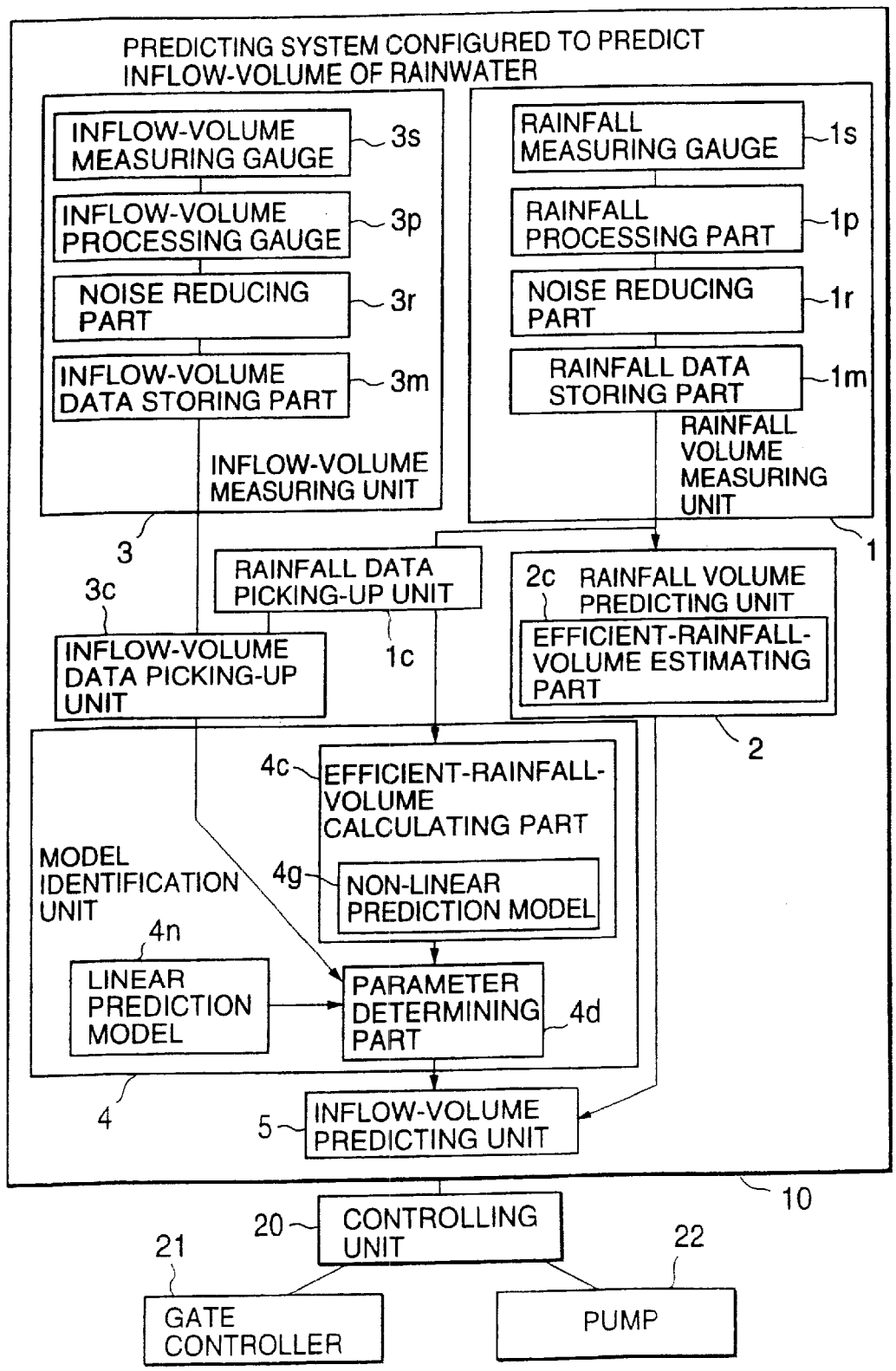
FIG. 6 is a schematic block diagram of a second embodiment of a predicting system configured to predict an inflow volume of rainwater according to the invention.

Next, a second embodiment of a predicting system configured to predict an inflow volume of rainwater according to the invention is explained with reference to FIG. 6. FIG. 6 is a schematic block diagram of the second embodiment of the predicting system.

As shown in FIG. 6, in the predicting system 10, the contributing-rainfall-volume volume processing part 4c is adapted to calculate contributing amounts of rainfall to inflow volumes of rainwater flowing into the objective facility, based on the respective preceding rainfalls and a non-linear model 4g. The model identification unit 4 has a linear prediction model 4n for calculating an inflow volume of rainwater from a rainfall volume, instead of the non-linear model. The parameter determining part 4d is adapted to determine a degree and coefficient parameters of the linear model 4n, based on the contributing amounts of rainfall calculated by the efficient-rainfall-volume calculating part 4c and the inflow volumes of rainwater that has flown into the objective facility by the present time measured by the inflow-volume measuring unit 3.

The other structures and members are substantially the same as the first embodiment shown in FIG. 1. In the second embodiment, the same numeral references correspond to the same structures as the first embodiment. The explanation of the same structures is not repeated.

In the second embodiment, the non-linear phenomenon about flowing of the rainwater into the objective facility is taken into consideration in calculating the contributing amounts of rainfall. Thus, the inflow volume of rainwater flowing into the objective facility can be predicted with a high accuracy, nevertheless the model for calculating the inflow volume of rainwater is the linear model.

Figure 7:
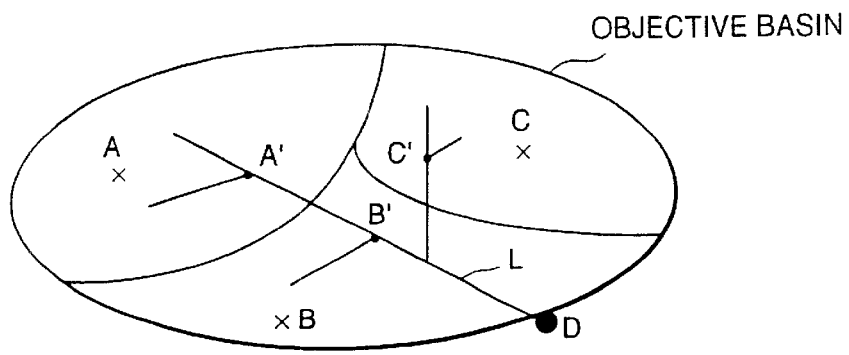
FIG. 7 is an explanatory view of an example of manner in the case of predicting a whole inflow volume from respective inflow volumes of parts of the basin.

In the above embodiments, the inflow volume as an output object is a single inflow volume. However, a plurality of inflow volumes at a plurality of points may be predicted at the same time. In the latter case, a plurality of prediction models may be provided for respective partial areas of the objective basin. In addition, a whole inflow volume may be predicted from the inflow volumes of the partial areas, by using a kinematics-wave method or a dynamics-wave method. For example, as shown in FIG. 7, the inflow volumes at the flowing points A', B' and C' are measured by on-ground flowing gauges A, B and C arranged in the respective partial areas. Then, the inflow volume flowing into a collecting facility D through a sewage duct L may be calculated by the kinematics-wave method or the dynamics-wave method.

Furthermore, higher accuracy may be expected when the determination of the degrees and the parameters by the parameter determining part 4d may be conducted on-line at any time.

Figure 8:
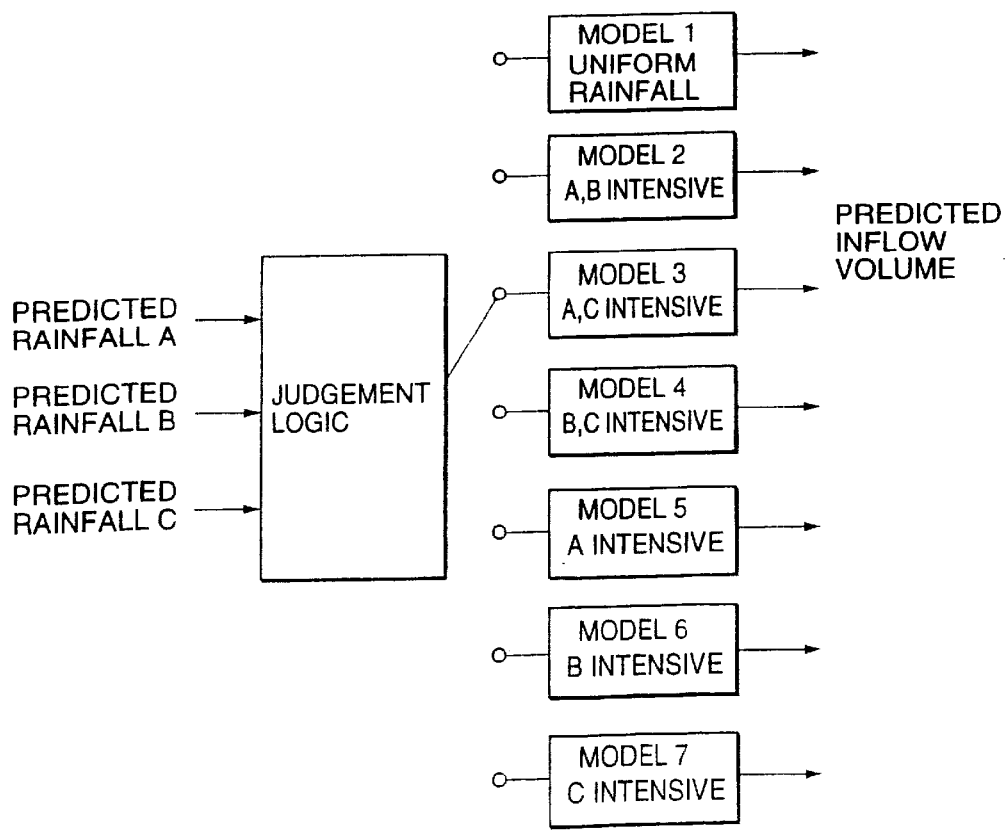
FIG. 8 is an explanatory view of an example of manner changing a plurality of predicting models.

Preferably, the prediction model determined by the parameter determining part is repeated to be rebuilt at a suitable cycle. Alternatively, a plurality of prediction models may be built, and one of them may be suitably selected. For example, as shown in FIG. 8, a plurality of prediction models may be provided wherein the plurality of prediction models correspond to respective relative relationships among respective rainfall conditions of the points A, B and C.

In detail, the plurality of prediction models may be a prediction model (model 1) corresponding to the case wherein the rainfall conditions of all the points are substantially equal (uniform), a prediction model (model 2) corresponding to the case wherein the amounts of rainfall at the points A and B are much greater (more intensive) than that at the point C, a prediction model (model 3) corresponding to the case wherein the amounts of rainfall at the points A and C are much greater (more intensive) than that at the point B, a prediction model (model 4) corresponding to the case wherein the amounts of rainfall at the points B and C are much greater (more intensive) than that at the point A, a prediction model (model 5) corresponding to the case wherein the rainfall volume at the point A is much greater (more intensive) than those at the points B and C, a prediction model (model 6) corresponding to the case wherein the rainfall volume at the point B is much greater (more intensive) than those at the points A and C, a prediction model (model 7) corresponding to the case wherein the rainfall volume at the point C is much greater (more intensive) than those at the points A and B, and so on.

In the case, according to the respective relative relationships among the respective rainfall conditions of the points A, B and C, an optimum predicting model may be adopted wherein data of the amounts of rainfall at the points A, B and C are suitably weighed or wherein time-delay is taken into consideration. Thus, the inflow volume of rainwater flowing into the objective facility can be predicted with a high accuracy.

This invention improves on the invention of Japanese Patent application 224766/1998 by the inventor of this invention. In the course of trials and experiments for the improvement, it is found that an inflow volume of rainwater in a near future may be easily predicted with a high accuracy from only a rainfall volume that has fallen by a present time, even if a rainfall volume in a future is not predicted.

That is, in order to predict the inflow volume of rainwater in the near future, it is also effective that the rainfall volume predicting unit for predicting amounts of rainfall in the future is not provided, and that the inflow-volume predicting unit predicts the inflow volume of rainwater flowing into the objective facility in the future based on the amounts of rainfall that has fallen by the present time measured by the rainfall volume measuring unit.

Figure 9:
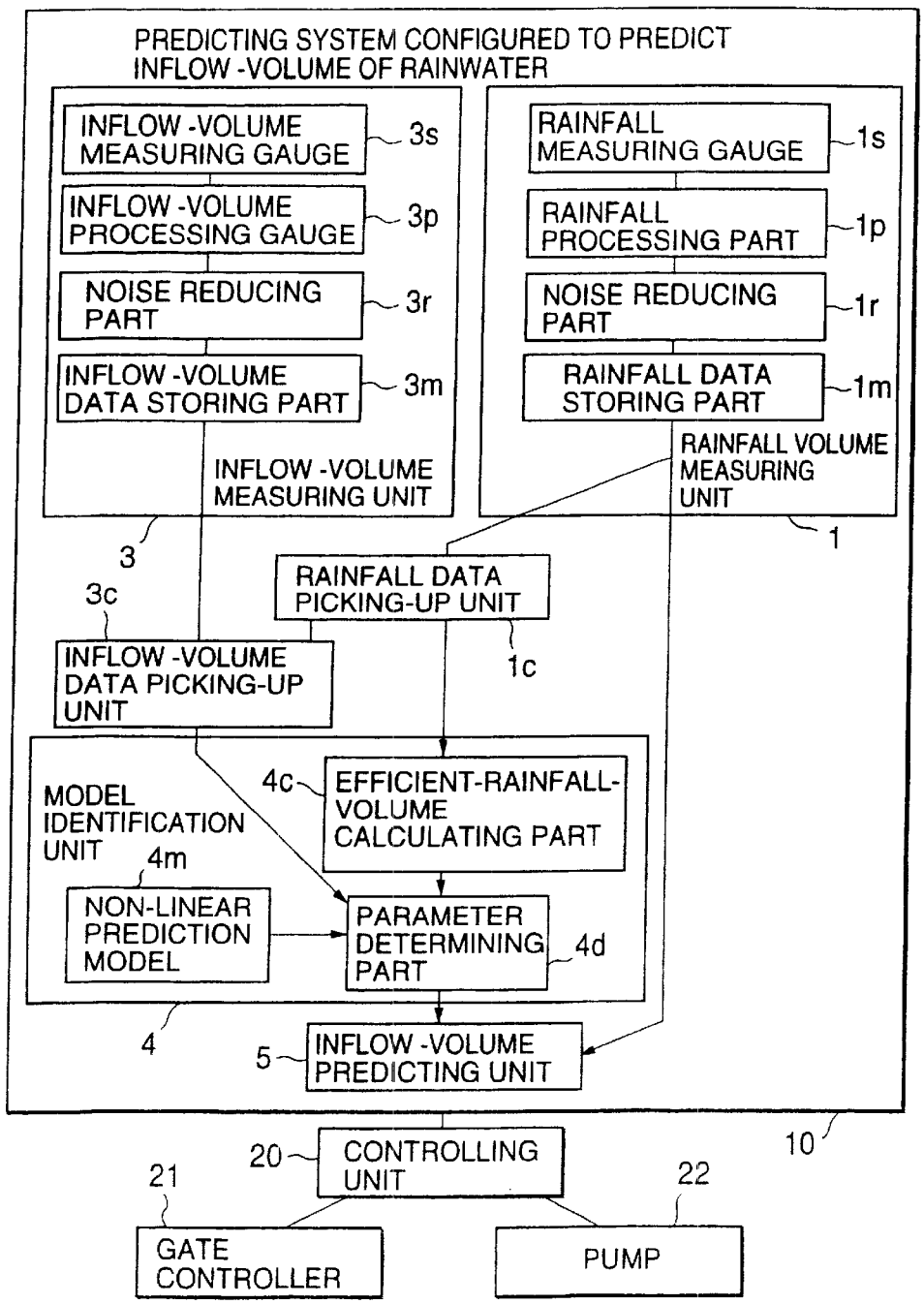
FIG. 9 is a schematic block diagram of a third embodiment of a predicting system configured to predict an inflow volume of rainwater according to the invention.

As an example of the above manner, a third embodiment of a predicting system configured to predict an inflow volume of rainwater according to the invention is explained with reference to FIG. 9. FIG. 9 is a schematic block diagram of the third embodiment of the predicting system.

As shown in FIG. 9, the predicting system 10 does not include the rainfall volume predicting unit 2 for predicting amounts of rainfall in the future. In addition, the inflow-volume predicting unit 5 is adapted to predict the inflow volume of rainwater flowing into the objective facility in the future, based on the amounts of rainfall that has fallen by the present time measured by the rainfall volume measuring unit 1, according to the non-linear predicting model determined by the model identification unit 4.

The other structures and members are substantially the same as the first embodiment shown in FIG. 1. In the third embodiment, the same numeral references correspond to the same structures as the first embodiment. The explanation of the same structures is not repeated.

According to the third embodiment, the inflow volume of rainwater in the near future can be easily predicted with a high accuracy, from only the amounts of rainfall that has fallen by the present time measured by the rainfall volume measuring unit In addition, in the third embodiment, the non-linear model 4*m* for calculating the inflow volume of rainwater from the amounts of rainfall is not limited to a non-linear model having a Neural-Network model. It may be for example a non-linear model having a Block-Oriented model.

Figure 10:
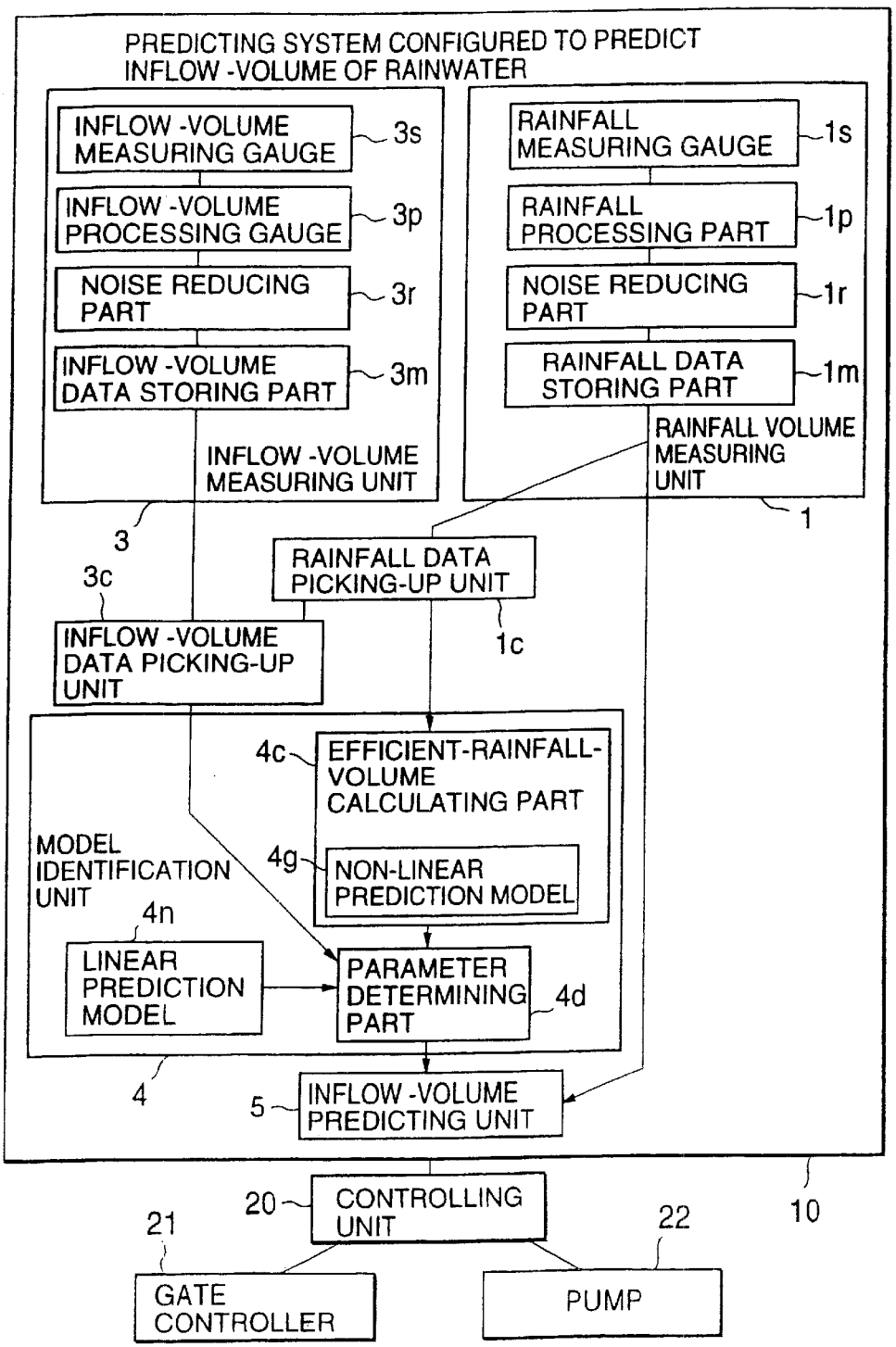
FIG. 10 is a schematic block diagram of a fourth embodiment of a predicting system configured to predict an inflow volume of rainwater according to the invention.
Figure 11:
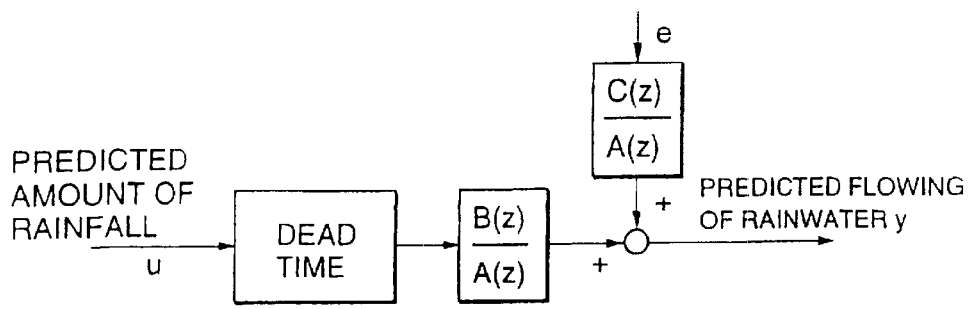
FIG. 11 is a schematic view of a conventional ARMAX model.

In addition, a fourth embodiment of a predicting system configured to predict an inflow volume of rainwater according to the invention is explained with reference to FIG. 10. FIG. 10 is a schematic block diagram of the fourth embodiment of the predicting system.

As shown in FIG. 10, the predicting system 10 does not include the rainfall volume predicting unit 2 for predicting amounts of rainfall in the future. In addition, the inflow-volume predicting unit 5 is adapted to predict the inflow volume of rainwater flowing into the objective facility in the future, based on the amounts of rainfall that has fallen by the present time measured by the rainfall volume measuring unit 1, according to the linear predicting model determined by the model identification unit 4.

The other structures and members are substantially the same as the second embodiment shown in FIG. 6. In the fourth embodiment, the same numeral references correspond to the same structures as the second embodiment. The explanation of the same structures is not repeated.

According to the fourth embodiment, the inflow volume of rainwater in the near future can be easily predicted with a high accuracy, from only the amounts of rainfall that has fallen by the present time.

As described above, according to the invention, the inflow volume of rainwater corresponding to the rainfall volume in the future is predicted by using the non-linear model having the Neural-Network model, whose degree and whose coefficient parameters are determined by the parameter determining part based on the rainfall volume that has fallen by the present time and the inflow volume of rainwater that has flown into the objective facility by the present time. Thus, the inflow volume of rainwater can be predicted with a high accuracy, even if a non-linear relationship may happen between the rainfall volume and the inflow volume of rainwater.

Alternatively, according to the invention, the efficient-rainfall-volume calculating part calculates the contributing rainfall-volume to the inflow volume of rainwater based on the preceding rainfall and the non-linear model, the parameter determining part determines the degree and the coefficient parameters of the linear model based on the contributing rainfall-volume and the inflow volume of rainwater, and the inflow volume of rainwater corresponding to the rainfall volume in the future is predicted by using the linear model. Thus, the inflow volume of rainwater flowing into the objective facility can be predicted with a high accuracy.

Alternatively, according to the invention, the inflow volume of rainwater in the future is predicted from the rainfall volume that has fallen by the present time by using the non-linear model, whose degree and whose coefficient parameters are determined by the parameter determining part based on the rainfall volume that has fallen by the present time and the inflow volume of rainwater that has flown into the objective facility by the present time. Thus, the inflow volume of rainwater in near future can be easily predicted with a high accuracy.

Alternatively, according to the invention, the efficient-rainfall-volume calculating part calculates the contributing rainfall-volume to the inflow volume of rainwater based on the preceding rainfall and the non-linear model, the parameter determining part determines the degree and the coefficient parameters of the linear model based on the contributing rainfall-volume and the inflow volume of rainwater, and the inflow volume of rainwater in the future is predicted from the rainfall volume that has fallen by the present time by using the linear model. Thus, the inflow volume of rainwater in near future can be easily predicted with a high accuracy.

What is claimed is:

1. A system configured to predict an inflow volume of rainwater, comprising:

a rainfall volume measuring unit for measuring a rainfall volume that has fallen by a present time;

a rainfall volume predicting unit for predicting a rainfall volume in a future time period;

an inflow-volume measuring unit for measuring an inflow volume of rainwater that has flowed into an objective facility by the present time;

a model identification unit comprising
a nonlinear model that includes a Neural-Network model for calculating an inflow volume of rainwater from a rainfall volume, and
a parameter determining part for determining degree and coefficient parameters of the nonlinear model, based on the rainfall volume that has fallen by the present time measured by the rainfall volume measuring unit and the inflow volume of rainwater that has flowed into the objective facility by the present time measured by the inflow-volume measuring unit;

an inflow-volume predicting unit for predicting an inflow volume of rainwater that will flow into the objective facility in a future time period, based on the future rainfall volume predicted by the rainfall volume predicting unit, according to the nonlinear model and parameters determined by the model identification unit; and wherein (1) the rainfall volume predicting unit is associated with the inflow-volume predicting unit and the rainfall volume measuring unit, and (2) the parameter determining part is associated with the rainfall volume measuring unit, the inflow-volume measuring unit, and the inflow-volume predicting unit.

2. A system configured to predict an inflow volume of rainwater according to claim 1, wherein:

the rainfall volume measuring unit is adapted to measure amounts of rainfall that have fallen in unit time periods up to the present time;

the inflow-volume measuring unit is adapted to measure inflow volumes of rainwater that have flowed into the objective facility in unit time periods up to the present time; and the parameter determining part is adapted to determine the degree and the coefficient parameters of the nonlinear model, based on a plurality of data that includes the amounts of rainfall that have fallen in the respective unit time periods up to the present time measured by the rainfall volume measuring unit and a plurality of data that includes the inflow volumes of rainwater that have flowed into the objective facility in the respective unit time periods up to the present time measured by the inflow-volume measuring unit.

3. A system configured to predict an inflow volume of rainwater according to claim 2, wherein:

the rainfall volume measuring unit is connected to a rainfall volume data picking-up unit which is adapted to pick up only necessary rainfall data from the plurality of data that includes the amounts of rainfall that have fallen in the respective unit time periods up to the present time measured by the rainfall volume measuring unit;

the inflow-volume measuring unit is connected to an inflow-volume data picking up unit which is adapted to pick up only data of the inflow volumes of rainwater corresponding to the picked up data of the amounts of rainfall, from the plurality of data on the inflow volumes of rainwater that have flowed into the objective facility in the respective unit time periods up to the present time measured by the inflow-volume measuring unit; and wherein the parameter determining part is associated with the rainfall volume data picking-up unit and the inflow-volume data picking unit.

4. A system configured to predict an inflow volume of rainwater according to claim 1, wherein:

the model identification unit includes an efficient rainfall-volume calculating part for calculating a contributing rainfall-volume to an inflow volume of rainwater flowing into the objective facility, based on preceding rainfall data;

the parameter determining part is adapted to determine the degree and the coefficient parameters of the nonlinear model, based on the contributing rainfall-volume calculated by the efficient-rainfall-volume calculating part and the inflow volume of rainwater that has flowed into the objective facility up to the present time measured by the inflow-volume measuring unit; and wherein the efficient rainfall-volume calculating part is associated with the rainfall volume measuring unit and the parameter determining part.

5. A system configured to predict an inflow volume of rainwater according to claim 1, wherein:

at least one of the rainfall volume measuring unit and the inflow-volume measuring unit has a noise-reducing part.

6. A system configured to predict an inflow volume of rainwater according to claim 1, wherein:

a plurality of rainfall volume measuring units are arranged in an area covered by the objective facility, for measuring a plurality of data of amounts of rainfall;

the rainfall volume predicting unit is adapted to predict a plurality of data that includes amounts of rainfall in a future time period corresponding to the plurality of rainfall volume measuring units;

the nonlinear model is a model into which a plurality of data are inputted;

the parameter determining part is adapted to determine the degree and the coefficient parameters of the nonlinear model based on the plurality of rainfall data measured by the plurality of rainfall volume measuring units and the inflow volume of rainwater that has flowed into the objective facility. by the present time measured by the inflow-volume measuring unit; and the inflow-volume predicting unit is adapted to predict the inflow volume of rainwater that will flow into the objective facility in the future, based on the plurality of data on the rainfall in a future time period predicted by the rainfall volume predicting unit, according to the nonlinear model determined by the model identification unit.

7. A system configured to predict an inflow volume of rainwater, comprising:
- a rainfall volume measuring unit for measuring a rainfall volume that has fallen by a present time;
- a rainfall volume predicting unit for predicting a rainfall volume in a future time period;
- an inflow-volume measuring unit for measuring an inflow volume of rainwater that has flowed into an objective facility by the present time;
- a model identification unit comprising
    - an efficient-rainfall-volume calculating part for calculating a contributing rainfall-volume to an inflow volume of rainwater flowing into the objective facility, based on preceding rainfall and a non-linear model,
    - a linear model for calculating an inflow volume of rainwater from a rainfall volume, and
    - a parameter determining part for determining degree and coefficient parameters of the linear model, based on the contributing rainfall-volume calculated by the efficient-rainfall-volume calculating part and the inflow volume of rainwater that has flowed into the objective facility by the present time measured by the inflow-volume measuring unit;
- an inflow-volume predicting unit for predicting an inflow volume of rainwater that will flow into the objective facility in a future time period, based on the future rainfall volume predicted by the rainfall volume predicting unit, according to the linear model and parameter determined by the model identification unit; and
- wherein (1) the rainfall volume predicting unit is associated with the rainfall volume measuring unit and the inflow-volume predicting unit, (2) the parameter determining part is associated with the inflow-volume measuring unit, the inflow-volume predicting unit, and the efficient-rainfall-volume calculating part, and (3) the rainfall volume measuring unit is associated with the efficient-rainfall-volume calculating part.

8. A system configured to predict an inflow volume of rainwater according to claim 1, wherein:
the parameter determining part has a program constructed by an algorithm using a least-squares method.

9. A system configured to predict an inflow volume of rainwater according to claim 7, wherein:
the parameter determining part has a program constructed by an algorithm using a least-squares method.

10. A system configured to predict an inflow volume of rainwater, comprising:
- a rainfall volume measuring unit for measuring a rainfall volume that has fallen by a present time;
- an inflow-volume measuring unit for measuring an inflow volume of rainwater that has flowed into an objective facility by the present time;
- a model identification unit having
    - a nonlinear model for calculating an inflow volume of rainwater from a rainfall volume, and
    - a parameter determining part for determining degree and coefficient parameters of the nonlinear model, based on the rainfall volume that has fallen by the present time measured by the rainfall volume measuring unit and the inflow volume of rainwater that has flowed into the objective facility by the present time measured by the inflow-volume measuring unit;
- an inflow-volume predicting unit for predicting an inflow volume of rainwater that will flow into the objective facility in a future time period, based on the rainfall volume that has fallen by the present time measured by the rainfall volume measuring unit, according to the nonlinear model and parameters determined by the model identification unit; and
- wherein (1) the parameter determining part is associated with the inflow-volume predicting unit, the inflow-volume measuring unit, and the rainfall volume measuring unit, and (2) the inflow-volume predicting unit is associated with the rainfall volume measuring unit.

11. A system configured to predict an inflow volume of rainwater according to claim 10, wherein:
- a plurality of rainfall volume measuring units are arranged in an area covered by the objective facility, for measuring a plurality of data of amounts of rainfall,
- the nonlinear model is a model into which a plurality of data are inputted,
- the parameter determining part is adapted to determine the degree and the coefficient parameters of the nonlinear model based on the plurality of rainfall data measured by the plurality of rainfall volume measuring units and the inflow volume of rainwater that has flowed into the objective facility by the present time measured by the inflow-volume measuring unit; and
- the inflow-volume predicting unit is adapted to predict the inflow volume of rainwater that will flow into the objective facility in the future, based on the plurality of data on the amounts of rainfall that has fallen by the present time measured by the plurality of rainfall volume measuring units, according to the nonlinear model determined by the model identification unit.

12. A system configured to predict an inflow volume of rainwater, comprising:
- a rainfall volume measuring unit for measuring a rainfall volume that has fallen by a present time;
- an inflow-volume measuring unit for measuring an inflow volume of rainwater that has flowed into an objective facility by the present time;
- a model identification unit having
    - an efficient-rainfall-volume calculating part for calculating a contributing rainfall-volume to an inflow volume of rainwater flowing into the objective facility, based on a preceding rainfall and a nonlinear model,
    - a linear model for calculating an inflow volume of rainwater from a rainfall volume, and
    - a parameter determining part for determining degree and coefficient parameters of the linear model, based on the contributing rainfall-volume calculated by the efficient-rainfall-volume calculating part and the inflow volume of rainwater that has flowed into the objective facility by the present time measured by the inflow-volume measuring unit;
- an inflow-volume predicting unit for predicting an inflow volume of rainwater that will flow into the objective facility in a future time period, based on the rainfall volume that has fallen by the present time measured by the rainfall volume measuring unit, according to the linear model determined by the model identification unit; and
- wherein (1) the parameter determining part is associated with the inflow-volume predicting unit, the inflow-volume measuring unit, and the efficient-rainfall-volume calculating part, and (2) the rainfall volume measuring unit is associated with the inflow-volume predicting unit and the efficient-rainfall-volume calculating part.

13. A method for predicting an inflow volume of rainwater flowing into an objective facility comprising:

measuring a rainfall volume that has fallen by a present time;

predicting a rainfall volume in a future time period using the measured rainfall volume;

measuring an inflow volume of rainwater that has flowed into an objective facility by the present time;

determining degree and coefficient parameters of a nonlinear model based on a rainfall volume that has fallen by the present time and an inflow volume of rainwater that has flowed into the objective facility by the present time; and predicting the inflow volume of rainwater that will flow into the objective facility in the future, based on a predicted future rainfall volume, according to the nonlinear model that includes a neural network model.

14. A method for predicting an inflow volume of rainwater flowing into an objective facility comprising:

measuring a rainfall volume that has fallen by a present time;

predicting a rainfall volume in a future time period using the measured rainfall volume;

measuring an inflow volume of rainwater that has flowed into an objective facility by the present time;

calculating a contributing rainfall-volume to the inflow volume of rainwater flowing into the objective facility based on the preceding rainfall and a nonlinear model;

determining degree and coefficient parameters of a linear model, based on the contributing rainfall-volume and an inflow volume of rainwater that has flowed into the objective facility by the present time; and predicting the inflow volume of rainwater that will flow into the objective facility in the future, based on a predicted future rainfall volume, according to the linear model.

15. A method for predicting an inflow volume of rainwater flowing into an objective facility comprising:

measuring a rainfall volume that has fallen by a present time;

measuring an inflow volume of rainwater that has flowed into an objective facility by the present time;

determining degree and coefficient parameters of a nonlinear model, based on a rainfall volume that has fallen by the present time and an inflow volume of rainwater that has flowed into the objective facility by the present time; and predicting the inflow volume of rainwater that will flow into the objective facility in the future, based on the rainfall volume that has fallen by the present time, according to the nonlinear model.

16. A method for predicting an inflow volume of rainwater flowing into an objective facility comprising:

measuring a rainfall volume that has fallen by a present time;

measuring an inflow volume of rainwater that has flowed into an objective facility by the present time;

calculating a contributing rainfall-volume to the inflow volume of rainwater flowing into the objective facility based on a preceding rainfall and a nonlinear model;

determining degree and coefficient parameters of a linear model, based on the contributing rainfall-volume and an inflow volume of rainwater that has flowed into the objective facility by the present time; and predicting the inflow volume of rainwater that will flow into the objective facility in the future, based on a rainfall volume that has fallen by the present time, according to the linear model.

17. A system configured to predict an inflow-volume of rainwater, comprising:

a rainfall volume measuring unit for measuring rainfall volume that has fallen by a present time, referred to as rainfall volume data;

an inflow-volume measuring unit for measuring an inflow volume of rainwater that has flowed into an objective facility by the present time, referred to as inflow-volume data;

a model identification unit having
a model for calculating an inflow-volume of rainfall from rainfall volume data, and
a parameter determining part for determining parameters in the model, based on at least one of the rainfall volume data and the inflow-volume data;

an inflow-volume predicting unit for predicting an inflow-volume of rainwater that will flow into the objective facility in a future time period, based on the rainfall volume data according to the model and parameters determined by the model identification unit; and wherein (1) the parameter determining part is associated with the rainfall-volume measuring unit, the inflow-volume predicting unit, and the inflow-volume measuring unit, and (2) the inflow-volume predicting unit is associated with the rainfall-volume measuring unit.

18. A system configured to predict an inflow-volume of rainwater according to claim 1, wherein the model is a linear model.

19. A system configured to predict an inflow-volume of rainwater according to claim 1, wherein the model is a nonlinear model.

* * * * *